United States Patent
Wang et al.

(10) Patent No.: US 6,692,534 B1
(45) Date of Patent: *Feb. 17, 2004

(54) SPECIALIZED BOOTH DECODING APPARATUS

(75) Inventors: Yong Wang, Mountain View, CA (US); Allan Tzeng, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/392,070

(22) Filed: Sep. 8, 1999

(51) Int. Cl.[7] .................................................. G06F 7/52
(52) U.S. Cl. ..................... 708/628; 708/628; 708/629; 708/603
(58) Field of Search ................................ 708/620, 625, 708/626, 627, 628, 629, 630, 631, 632

(56) References Cited

U.S. PATENT DOCUMENTS

| | | | | | |
|---|---|---|---|---|---|
| 4,825,401 A | * | 4/1989 | Ikumi | .......................... | 708/630 |
| 5,521,856 A | * | 5/1996 | Shiraishi | ...................... | 708/628 |
| 6,233,597 B1 | * | 5/2001 | Tanoue et al. | .............. | 708/625 |

* cited by examiner

*Primary Examiner*—Chuong Dinh Ngo
(74) *Attorney, Agent, or Firm*—Martine & Penilla, LLP

(57) ABSTRACT

The present invention provides an apparatus for booth decoding which stores the most significant bit of the lower half of the number used as the key for booth decoding. By using this stored bit to determine the rightmost booth group corresponding to the upper half of the key, booth decoding may be accomplished more quickly using an apparatus that is simpler and smaller than prior art assemblies.

5 Claims, 7 Drawing Sheets

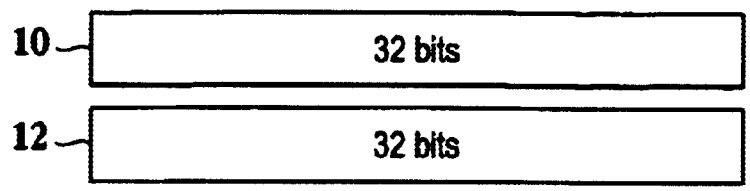
Fig. 1A *(Prior Art)*
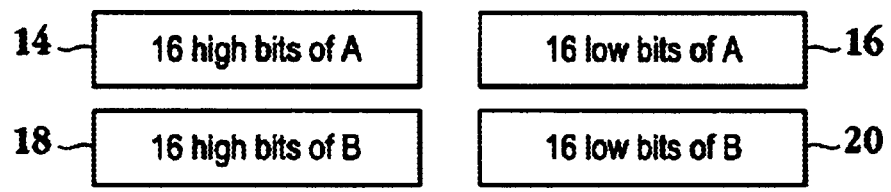
Fig. 1B *(Prior Art)*
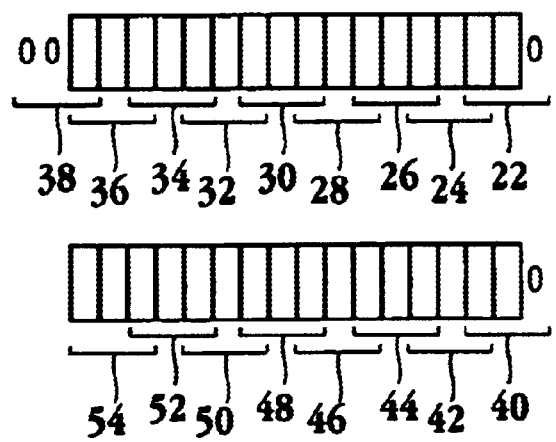
Fig. 1C *(Prior Art)*

SPECIALIZED BOOTH DECODING APPARATUS

BACKGROUND OF THE INVENTION

1. Field of the Invention

The present invention relates to combination multiplication and addition operations in a computing environment. More particularly, the present invention relates to an apparatus for performing nonparallel and parallel multiplication/addition operations, and a method for operating that apparatus.

2. The Background Art

In modern computers, it is often true that multiplication operations must be performed in order to satisfy a given objective. Those multiplication operations are often performed in either of two ways, traditional and parallel.

This disclosure primarily concerns itself with traditional multiplication where two numbers such as those seen in FIG. 1A are split into upper and lower halves such as those seen in FIG. 1B. The upper and lower halves are then multiplied together in four operations, i.e the upper half of the first number is multiplied with the upper and lower halves of the second number, and the lower half of the first number is multiplied with the upper and lower halves of the second number, and then the four results are added together to form the final result of the multiplication.

Therefore, two numbers "A" and "B" (shown here as numbers 10 and 12, each being 32-bits wide in this example) being multiplied together will each be broken into 16-bit halves, resulting in an upper half 14 and a lower half 16 from original number 10, and an upper half and a lower half 20 from original number 12.

Once the numbers are split apart into halves, and operation known as booth decoding is performed on one of the two halves as a first step in the multiplication of that number with the other number.

Booth decoding is a process by which overlapping groups of three bits each chosen from a first number are used to determine quantities of the second number which must be added together in order to produce a correct final multiplication result. In the example which follows, a first number and a second number are to be multiplied together. The second number is used as the key in booth decoding. In booth decoding when using the lower bits of the second number, a leading zero is added as the least significant bit of the lower half of the second number resulting in three-bit groups such as booth groups 22, 24, 26, 28, 30, 34, 36, and 38. Group 38 has two zeros added as most significant bits of the lower half, in order to properly complete that group.

When determining booth groups corresponding to the upper half of the second number, prior art systems again add a zero as the least significant bit of that upper half and use that zero when determining the rightmost booth group such as booth group 40. The remaining booth groups such as booth groups 42, 44, 46, 48, 50, 52, and 54 are then determined as previously described.

In, order to determine the nine booth groups associated with this lower half of the second number, and also properly use those nine booth groups, the prior art uses the apparatus depicted in FIG. 2.

Referring to FIG. 2, prior art system 56 includes booth recoder 58 which has and input for receiving a first number and an input for receiving a second number. Booth recoder 58 has nine outputs, each of those nine outputs providing partial products corresponding to the respective booth groups 22, 24, 26, 28, 30, 32, 34,.36, and 38. Eight of the nine outputs are provided in groups of four to two 4:2 compressors 60 and 62 the outputs of which are said to a third 4:2 compressor 64.

The ninth output 66 of booth recoder 58 together with the two outputs 68 and 70 of 4:2 compressor 64 are provided to 3:2 compressor 72. The two outputs of 3:2 compressor 72 are then provided to adder 74 to perform the final addition operation required. Output 76 of adder 74 is the final result of the multiplication.

While prior art systems are suitable for their intended purpose they require hardware which is unnecessary and which requires valuable space which could otherwise be used for different purpose. It would therefore be beneficial to provide a system which requires less hardware and therefore requires less space. This benefit and others are provided by the present invention.

SUMMARY OF THE INVENTION

The present invention provides an apparatus for booth decoding which stores the most significant bit of the lower half of the number used as the key for booth decoding. By using this stored bit to determine the rightmost booth group corresponding to the upper half of the key, booth decoding may be accomplished more quickly using an apparatus that is simpler and smaller than prior art assemblies.

BRIEF DESCRIPTION OF THE DRAWINGS

FIGS. 1A, 1B and 1C show prior art binary groups involved in the booth decoding process.

DETAILED DESCRIPTION OF ONE EMBODIMENT

Those of ordinary skill in the art will realize that the following description of the present invention is illustrative only and not in any way limiting. Other embodiments of the invention will readily suggest themselves to such skilled persons who are familiar with this disclosure.

Figure 2:
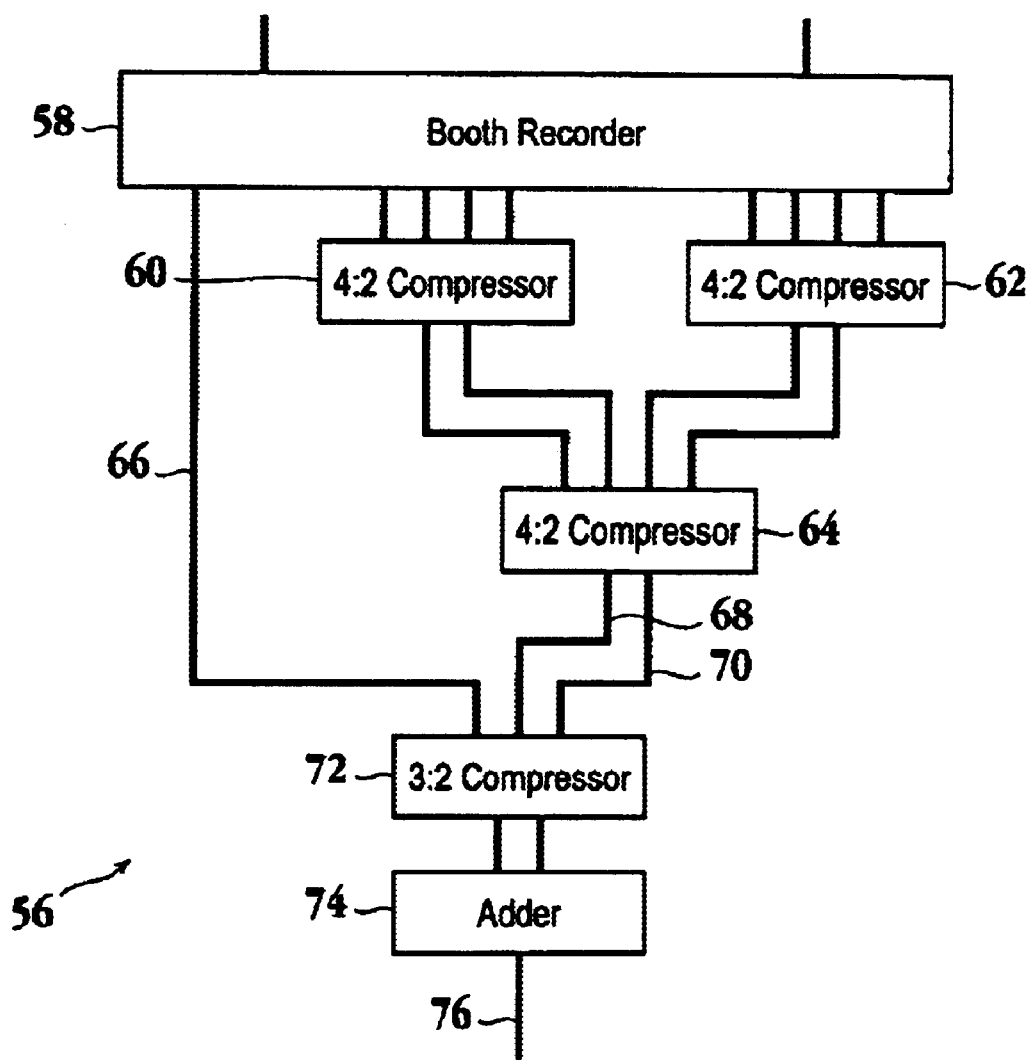
FIG. 2 is a block diagram of a prior art apparatus for performing the function N=A*B.
Figure 3:
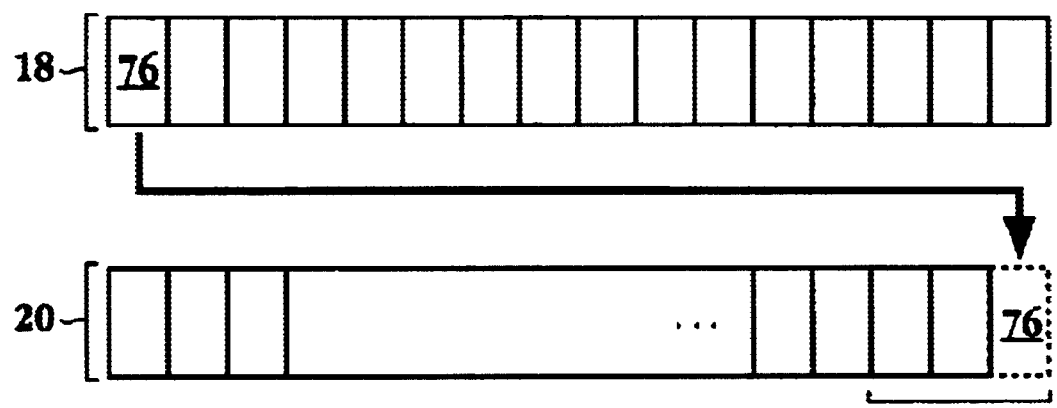
FIG. 3 shows binary groups involved in the present invention booth decoding process.

The present invention provides a method and apparatus for booth recoding which stores the most significant bit of the lower half bits of the number being used to create booth groups and uses that most significant bit when determining the rightmost booth group from the upper half bits of that same number. FIG. 3 shows binary groups involved in the present invention booth decoding process.

Referring to FIG. 3, the same lower half bits 18 and upper half bits 20 are used as was previously seen with respect to FIG. 1B. However, when determining booth groups with respect to upper half bits 20, rather than padding lower half bits 20 with a zero in the least significant bit position, the present invention instead stores the value of most significant bit 76 from lower half bits 18 and uses that value in the least significant bit position for upper half bits 20.

Figure 4:
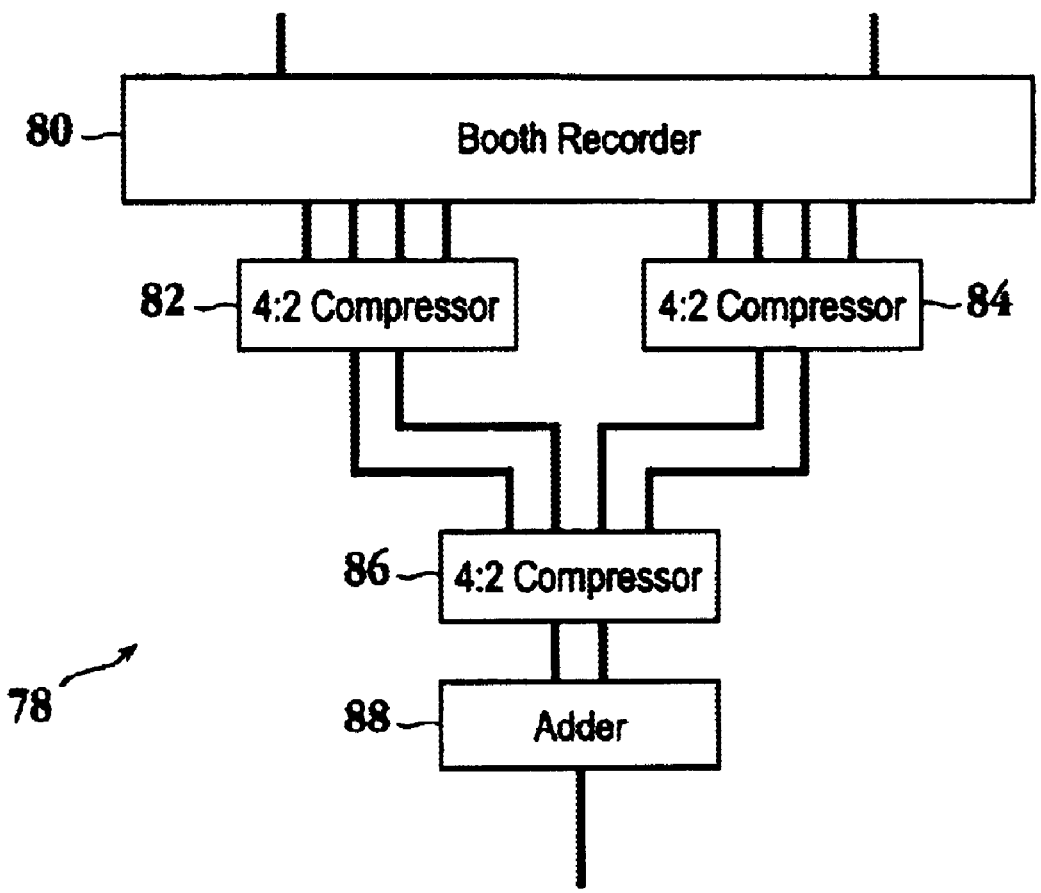
FIG. 4 is a block diagram showing a present invention apparatus for performing the function N=A*B.

FIG. 4 is a block diagram showing a present invention apparatus for performing the function N=A*B.

Referring to FIG. 4, system 78 includes booth recoder 80, 4:2 compressors 82, 84, and 86, and adder 88. Each 4:2 compressor takes in four partial products of equal width and provides carry and sum outputs which would represent those partial products added together. By adding those partial products together in stages, number A,or its higher or lower bits, are added together the proper number of times so that when the resulting upper and lower halves are put back together, the correct multiplication result is achieved.

Table 1 below shows the selection of each partial product according to the particular three-bit booth group.

TABLE 1

| Booth group | Partial product |
| --- | --- |
| 000 | 0 |
| 001 | A |
| 010 | A |
| 011 | 2A |
| 100 | −2A |
| 101 | −A |
| 110 | −A |
| 111 | 0 |

Using Table 1 above, if a given booth group was "011", the partial product chosen as the associated input to the respective compressor would be the binary number which is twice the value of the first number.

For traditional multiplication, booth recoder 80 selects booth groups such as booth groups 22, 24, 26, etc. previously described in relation to FIG. 1C, and then provides the corresponding partial products to the inputs of 4:2 compressors 82 and 84. A key feature however with the present invention is that by using the value of bit 76 of FIG. 3, the present invention multiplication system is not required to have electronic circuits which produce a ninth booth group such as booth group 38 of FIG. 1C. Nor is the present invention apparatus required to have 3:2 compressor 72 as was required by the prior art.

Amendment to the Specification

All 4:2 compressors described herein are intended to compress four inputs into two outputs. They may comprise full adders as are known to those of ordinary skill in the art, or may instead comprise compressors such as are described in U.S. patent application Ser. No. 09/391,166, filed Sep. 8, 1999, now U.S. Pat. No. 6,532,485 entitled "METHOD AND APPARATUS FOR PERFORMING MULTIPLICATION/ADDITION OPERATIONS", naming Yong Wang as inventor, assigned to Sun Microsystems, Inc., the entire application being incorporated herein by reference.

The outputs of 4:2 compressors 82 and 84 are provided as inputs to 4:2 compressor 86.

The outputs of 4:2 compressor 86 is provided to carry-sum adder 88.

The output of adder 88 is the 32 bit desired number N, the result of performing the operation N=A*B.

There are many ways to determine booth groups from a given binary number. However, the heart of the invention is in providing the booth group which includes the MSB of the lower half of the number, together with the least significant two bits of the upper half of the number. The present invention stores the MSB of the lower half of the number is a flip-flop or other suitable storage means, making that bit of information easily available when the next booth group requiring that bit is determined.

Figure 5:
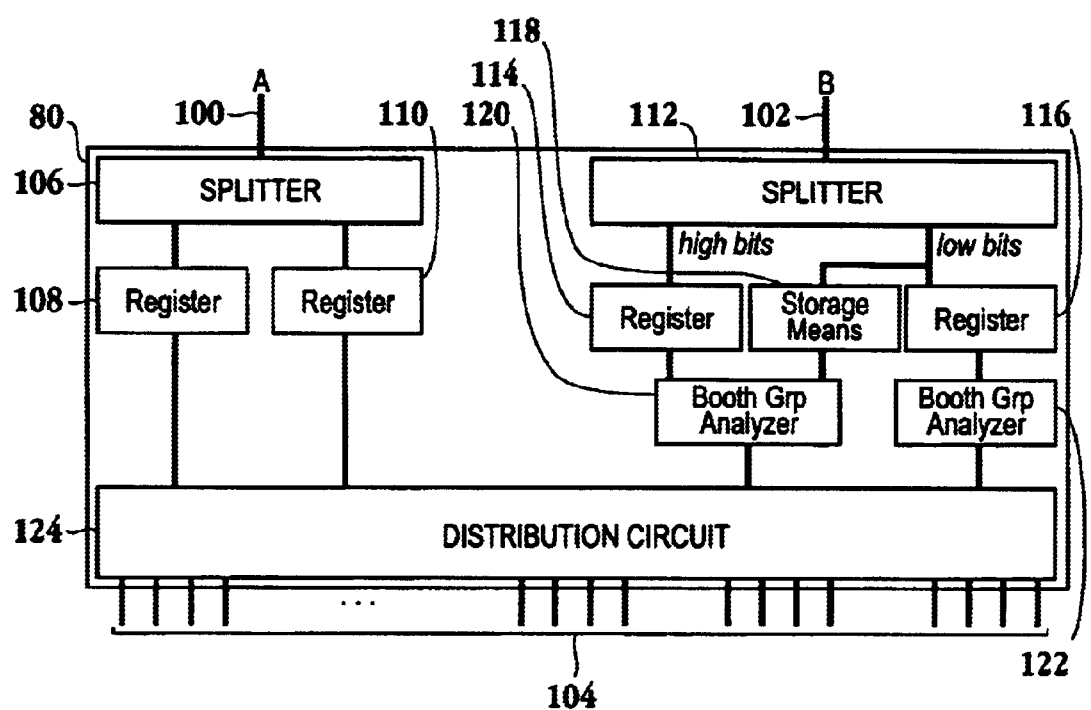
FIG. 5 is a block diagram of a booth decoder incorporating the present invention.

FIG. 5 is a block diagram of a booth decoder incorporating the present invention.

Referring to FIG. 5 decoder 80 includes inputs 100 and 102, and outputs 104. Input 100 is used to provide a first number A to splitter 106 which splits first number A into upper and lower halves, and stores those halves in registers 108 and 110 respectively. Input 102 is used to provide a second number B to splitter 112 to which splits second number B into upper and lower halves which are stored in registers 114 and 116 respectively. Storage means 118 is provided to copy and contain the MSB of the lower half bits of second number B, for use when determining the first booth group pertaining to the upper half of number B. At the proper times, registers 114 and 116 and storage means 118 provide their outputs to booth group analyzers 120 and 122 which in turn provide their outputs to distribution circuit 124. Booth group analyzers 120 and 122 analyze the bit information contained in registers 114 and 116, and provide the proper booth groups to distribution circuit 124.

Distribution circuit 124 provides the proper partial products on outputs 104, the partial product for a give booth group being determined according to table 1 as previously described. Thus, distribution circuit 124 will be responsible for sampling registers 108 and 110 at the appropriate times and providing a "0", A,−A, 2A or −2A on respective ones of its outputs, based on the booth group which corresponds to that partial product output.

Figure 6:
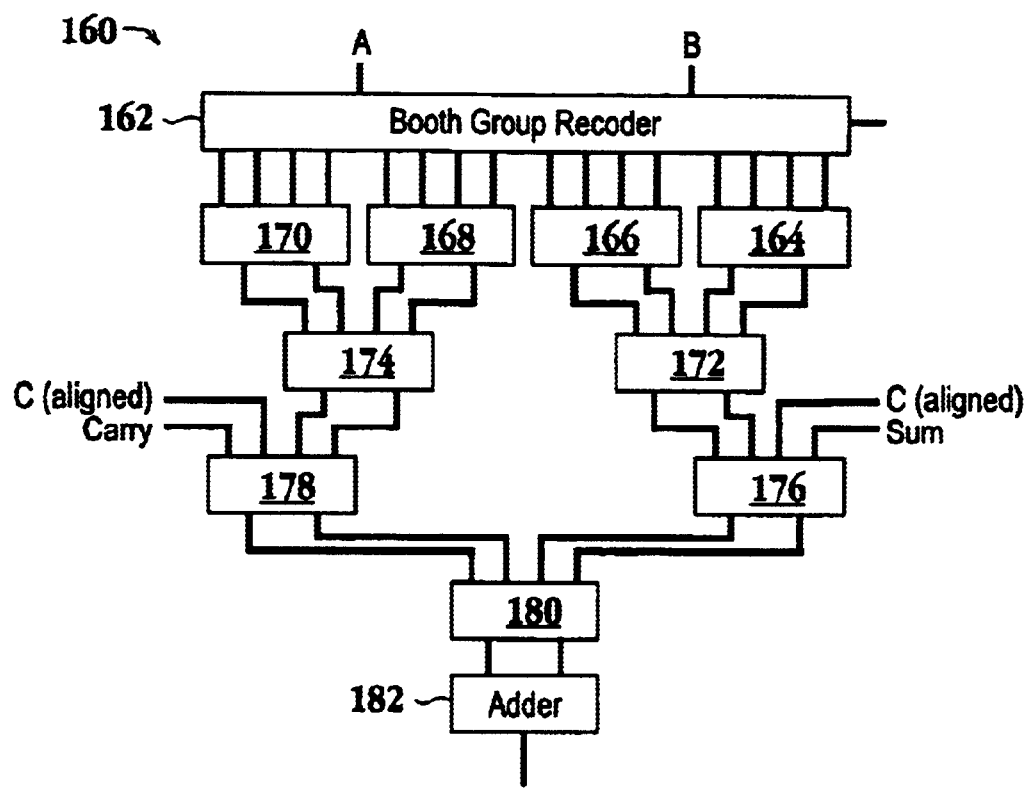
FIG. 6 is a block diagram showing the present invention apparatus for performing the function N=A*B+C.

FIG. 6 is a block diagram showing a present invention apparatus for performing the function N=A*B+C.

Referring to FIG. 6, system 160 includes booth recoder 162, 4:2 compressors 164, 166, 168, 170, 172, 174, 176, 178, and 180, and adder 182. For traditional operations, booth recoder 62 selects booth groups such as booth groups discussed herein, and then provides the corresponding partial products according to table 1 above to the inputs of 4:2 compressors 164, 166, 168, and 170. The outputs of 4:2 compressors 164, 166, 168, and 170 are then provided as inputs to 4:2 compressors 172 and 174.

The outputs of 4:2 compressors 172 and 174 are provided to 4:2 compressors 176 and 178 respectively. Two other inputs to 4:2 compressor 176 are the 32 bits of number C (properly aligned), from the equation N=A*B+C, and an input tied to a binary zero. Two other inputs to 4:2 compressor 178 are the 32 bits of number C (properly aligned), from the equation N=A*B+C, and an input tied to a binary zero. The inputs that are tied to binary zero may alternatively be removed, and the circuits for the respective 4:2 compressors designed to imply a zero.

To have number C properly aligned means that C is provided to 4:2 compressors in the same manner as are other inputs. Thus, bit 0 of number C is provided to the rightmost bitwise compressor within 4:2 compressors 176 and 178, and bit 1 provided to the next left-oriented bitwise compressor and so on.

The outputs of 4:2 compressors 176 and 178 are then provided to 4:2 compressor 180. The output of 4:2 compressor 180 is then provided to carry-sum adder 182 for the final addition. The output of adder 182 is the 32 bit desired number N, the result of performing the operation N=A*B+ C.

The apparatus of FIG. 6 is significantly faster and requires substantially less space to implement than the prior art apparatus's. Further, using the present invention apparatus in a manner slightly differently than just described allows the performance of the same computation N=A*B+C using a technique known as "traditional." Thus, the apparatus of FIG. 6 may be used for both traditional and parallel computations, a feat not able to be accomplished with prior art apparatus's.

When performing traditional multiplication/adds as described above, the first booth group has a least significant bit of zero, and each succeeding booth group is chosen in overlapping three bit groups, using all bits in the original number B.

When performing parallel multiplication/adds, the first number is separated into two halves, an upper half and a lower half. The upper half has the high bits which were present in the original first number, combined with a number of least significant bits (LSB) having zeros, the number of LSB's bringing the new upper half to be the same width as the original number.

The lower half is sign extended to be the same width as the original number. Thus, if the original number A is 32 bits wide, the lower half is sign extended from 16 bits to 32 bits.

Figure 7:
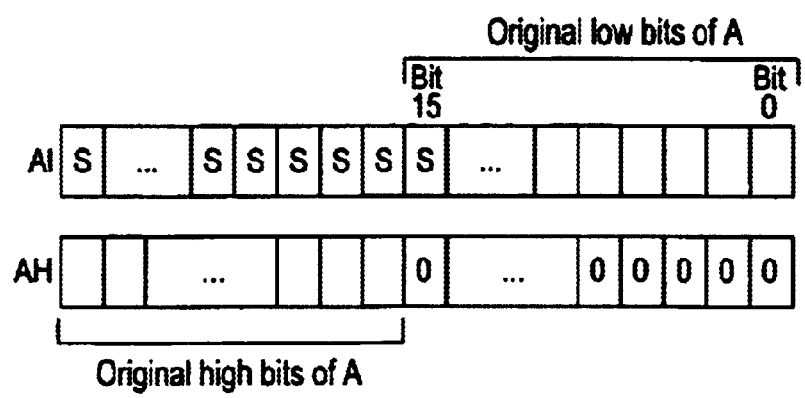
FIG. 7 shows one example of new numbers formed from the original upper and lower halves of original number A.

FIG. 7 shows one example of a new number formed from the original upper and lower halves of original number A.

The new upper and lower halves are then processed using the FIG. 6 apparatus as previously described, using the upper and lower halves of the second number B to determine the booth groups for the new upper and lower halves of A. When determining the booth groups corresponding to the new upper half of A, a zero is added to the least significant bit position of the upper half of B, and two zeros are added to the most significant bit position of the upper half of B in the case of unsigned multiplication, or is alternatively sign extended two bits in the case of signed multiplication/add operations, as described previously.

Figure 8:
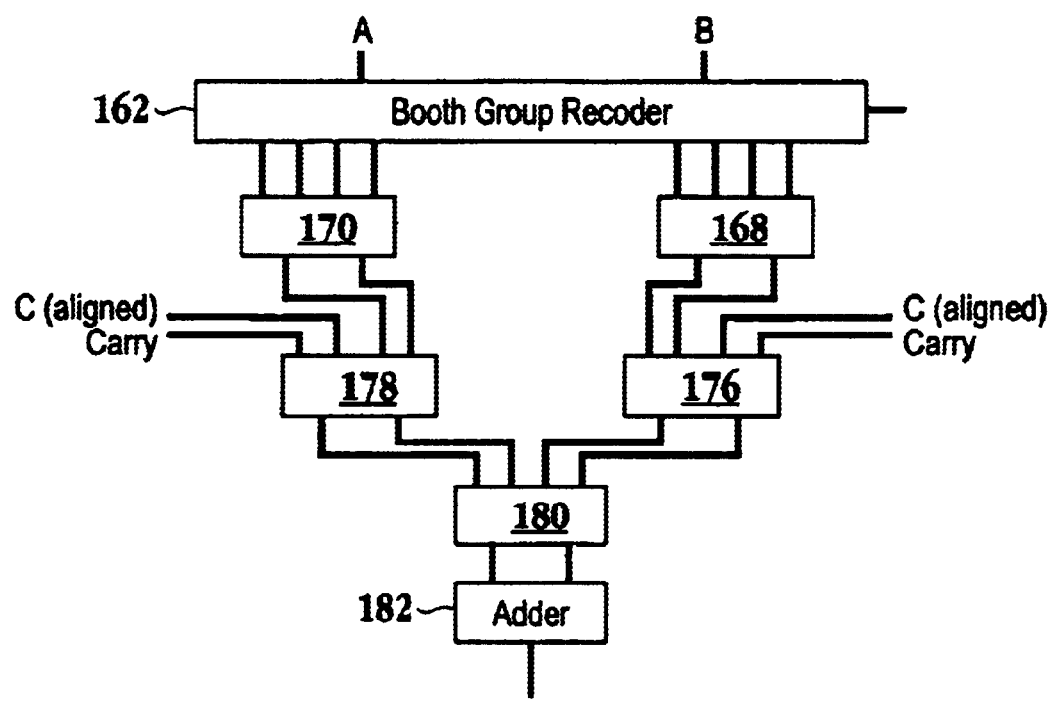
FIG. 8 is a block diagram of an alternative embodiment of FIG. 6.

Those of ordinary skill in the art having the benefit of this disclosure will readily recognize that the present invention may easily be adapted to systems having 8, 32, 64, 128 bits per number or more, by constructing 4:2 compressors with a number of bitwise compressors equal to the number of bits in each number A, B, and C, and by using suitable numbers of those 4:2 compressors in a tree form as shown in FIGS. 6 or 8, also depending on the number of bits involved in the original numbers A, B, and C.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. An apparatus, comprising:
   a booth recoder including:
   first and second splitters, each having an input for receiving a number to be split into upper and lower halves and two outputs for outputting the upper and lower halves of a split number,
   first, second, third and fourth registers, said first and second registers having inputs coupled to individual outputs of said first splitter, and an output, said third and fourth registers having inputs coupled to individual outputs of said second splitter, and an output;
   bit storage means having an input coupled to the most significant bit of the lower half output of said second splitter, and an output;
   a first booth group analyzer having a first input coupled to the output of said third register, a second input coupled to the output of said bit storage means, and an output, said first booth group analyzer being configured to receive bits making up a binary number and providing partial products on its output corresponding to booth groups corresponding to the values of said bits;
   a second booth group analyzer having an input coupled to the output of said fourth register, and an output, said second booth group analyzer being configured to receive bits making up a binary number and providing partial products on its output corresponding to booth groups corresponding to the values of said bits;
   a distribution circuit having first and second inputs being individually coupled to the outputs of said first and second registers, and third and fourth inputs being individually coupled to the outputs of said first and second booth group analyzers, and a number of outputs corresponding to half the bit width of the numbers received by said first and second splitters, said distribution circuit being configured to receive booth groups corresponding to the value of bits in and providing partial products through said number of outputs corresponding to said booth groups;
   nine 4:2 compressors, a first set of four of the nine compressors each intended to compress four inputs corresponding to said number of outputs of distribution circuit into 2 outputs, a second set of four of the nine compressors configured to reduce outputs of the first set to a remaining 4:2 compressor.

2. The apparatus of claim 1, wherein a configuration of the nine 4:2 compressors includes,
   first, second, third and fourth 4:2 compressors each having four inputs individually coupled to consecutive ones of said number of outputs, a carry output and a sum output,
   fifth and sixth 4:2 compressors each having four inputs, said first and third inputs of said fifth and sixth compressors being individually coupled to said sum outputs of said first, second third and fourth compressors respectively, said second and fourth inputs of said fifth and sixth compressors being individually coupled to said carry outputs of said first, second, third and fourth compressors respectively, a carry output and a sum output;
   seventh and eighth 4:2 compressors each having four inputs, said first, second, third and fourth inputs of said seventh compressor being individually coupled to a carry input, a source of a third binary number, said fifth compressor carry output, and said fifth compressor sum output, said first, second, third and fourth inputs of said eighth compressor being individually coupled to said sixth compressor carry output, said sixth compressor sum output, said source of the third number, and a sum input;
   a ninth 4:2 compressor having four inputs, said first and third inputs of said ninth compressor being individually coupled to said sum outputs of said seventh and eighth compressors respectively, said second and fourth inputs of said ninth compressor being individually coupled to said carry outputs of said seventh and eighth compressors respectively; and
   an adder having two inputs individually coupled to said carry and sum outputs of said ninth compressor, and an output.

3. The apparatus of claim 2 wherein the number has a width of 32 bits.

4. A method for determining booth groups for a multiplying 16 bit binary numbers, comprising;

separating each of said 16-bit binary numbers into an upper half and a lower half, each half comprising eight bits;

creating a new lower half by padding said lower half by adding a zero bit into a rightmost bit position of said lower half, said new lower half comprising nine bits, an upper eight bits of said new lower half comprising an original eight bits from said lower half, the least significant bit of the new lower half being a zero;

storing the new lower half in a first register;

determining a maximum of four booth groups corresponding to said new lower half;

storing a most significant bit of said lower half in a temporary storage location;

creating a new upper half by padding said upper half by adding the most significant bit of said lower half into a rightmost bit position of said upper half, said new upper half comprising nine bits, an upper eight bits of said new upper half comprising an original eight bits from said upper half, the least significant bit of the new upper half equaling the most significant bit of said lower half;

storing the new upper half in a second register;

determining four booth groups corresponding to said new upper half;

coupling each one of the four booth groups as inputs to a corresponding 4:2 compressor;

compressing the inputs to each of the corresponding 4:2 compressor;

providing outputs from each of the corresponding 4:2 compressor to an additional corresponding 4:2 compressor;

providing an alien signal and one of a carry and sum signal to each additional corresponding 4:2 compressor; and combining the outputs of the additional corresponding 4:2 compressors to determine a desired number.

5. A method for determining booth groups for multiplying 32-bit binary numbers comprising:

separating each of said 32-bit binary numbers into an upper half and a lower half, each half comprising sixteen bits;

creating a new lower half by padding said lower half by adding a zero bit into a rightmost bit position of said lower half, said new lower half comprising seventeen bits, an upper sixteen bits of said new lower half comprising an original sixteen bits from said lower half, a least significant bit of the new lower half being a zero;

storing the new lower half in a first register;

determining a maximum of eight booth groups corresponding to said new lower half;

storing a most significant bit of said lower half in a temporary storage location;

creating a new upper half by padding said upper half by adding the most significant bit of said lower half into a rightmost bit position of said upper half, said new upper half comprising seventeen bits, an upper sixteen bits of said new upper half comprising an original sixteen bits from said upper half, the least significant bit of the new upper half equaling the most significant bit of said lower half, storing the new upper half in a second register;

determining eight booth groups corresponding to said new upper half;

coupling each one of the eight booth groups as inputs to corresponding 4:2 compressor;

compressing the inputs to each of the corresponding 4:2 compressors successively to yield two outputs;

providing the two outputs to a respective 4:2 compressors;

providing an align signal and one of a carry and sum signal to the respective 4:2 compressors;

delivering outputs of the respective 4:2 compressors to an adder; and determining a desired number.

\* \* \* \* \*